US008286921B2

(12) United States Patent
Heller

(10) Patent No.: US 8,286,921 B2
(45) Date of Patent: Oct. 16, 2012

(54) HIGH LIFT SYSTEM ON THE AIRFOIL OF AN AIRCRAFT

(75) Inventor: Gerd Heller, Hellwege (DE)

(73) Assignee: Airbus Operations GmbH, Hamburg (DE)

( * ) Notice: Subject to any disclaimer, the term of this patent is extended or adjusted under 35 U.S.C. 154(b) by 445 days.

(21) Appl. No.: 12/598,728

(22) PCT Filed: May 5, 2008

(86) PCT No.: PCT/EP2008/003595
§ 371 (c)(1),
(2), (4) Date: Feb. 3, 2010

(87) PCT Pub. No.: WO2008/135266
PCT Pub. Date: Nov. 13, 2008

(65) Prior Publication Data
US 2010/0155542 A1    Jun. 24, 2010

(30) Foreign Application Priority Data
May 4, 2007    (DE) .......................... 10 2007 020 870

(51) Int. Cl.
*B64C 3/54* (2006.01)
(52) U.S. Cl. ..................................................... 244/214
(58) Field of Classification Search .......... 244/211–217, 244/123.1
See application file for complete search history.

(56) References Cited

U.S. PATENT DOCUMENTS

| 1,780,838 | A |   | 11/1930 | Page |
| 1,861,318 | A | * | 5/1932 | Page ............................. 244/211 |
| 2,137,879 | A | * | 11/1938 | Ksoll ............................ 244/216 |
| 4,915,327 | A |   | 4/1990 | Ellmers et al. |
| 5,839,699 | A |   | 11/1998 | Bliesner |
| 2002/0195527 | A1 |   | 12/2002 | Broadbent |

FOREIGN PATENT DOCUMENTS
GB    2 138 756 A    10/1984

OTHER PUBLICATIONS

International Search Report dated Sep. 23, 2008, PCT/ISA/210, two (2) pages.
Written Opinion of the International Searching Authority, PCT/ISA/237, six (6) pages.

* cited by examiner

*Primary Examiner* — Timothy D Collins
*Assistant Examiner* — Brian M O'Hara
(74) *Attorney, Agent, or Firm* — Crowell & Moring LLP

(57) ABSTRACT

A high-lift system on a wing with a curved nose and a leading-edge flap mounted via levers for movement between retracted and extended positions while expanding the airfoil profile, increasing its curvature and exposing a gap for guiding air from under the flap to above the wing. The levers form a four bar mechanism including first and second levers respectively pivotably connected at one end to spaced first and second points on the wing. The other ends of the levers are connected to opposite ends of a third lever forming part of the flap. The length and positions of the levers and the curvature of the wing nose are matched such that during initial extension from retracted position to an intermediate position the trailing edge of the flap blocks the gap between the flap and wing, and during further extension beyond the intermediate position the gap is exposed.

15 Claims, 8 Drawing Sheets

Figure 1:
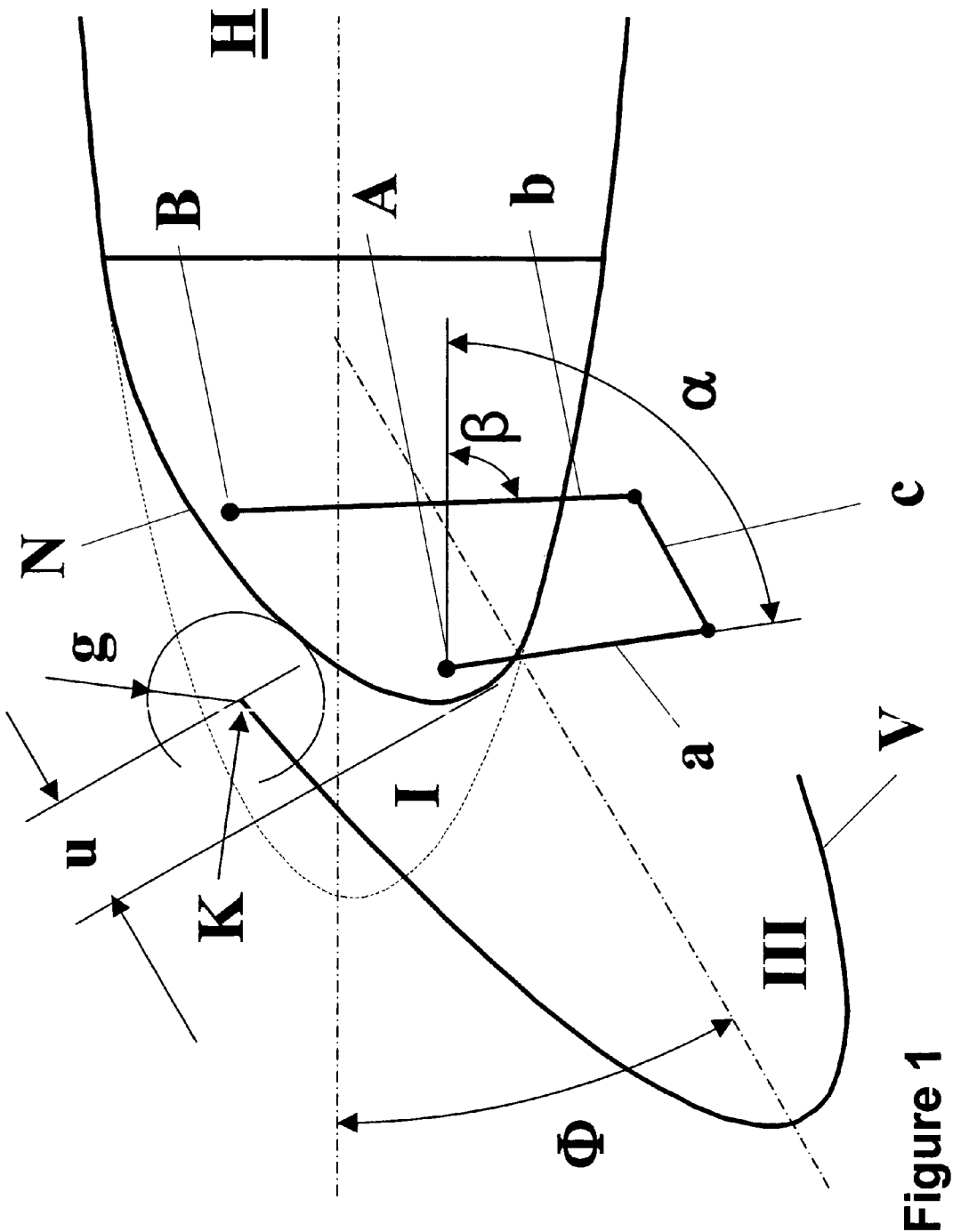

|  | Variants | I | II | III | IV |
|---|---|---|---|---|---|
|  | a | 100% | 60% | 35% | 93% |
|  | b | 155% | 145% | 80% | 160% |
|  | c | 60% | 40% | 66% | 67% |
|  | AB | 100% | 100% | 100% | 100% |
| Landing | Δα | 75° | 80° | 94° | 70° |
|  | Δβ | 45° | 32° | 35° | 34° |
|  | Φ | 30° | 28° | 234° | 28° |
| Start | Δα | 30° | 20° | 40° | 25° |
|  | Δβ | 15° | 6° | 10° | 8° |
|  | Φ | 20° | 18° | 15° | 18° |

Figure 8

HIGH LIFT SYSTEM ON THE AIRFOIL OF AN AIRCRAFT

The invention relates to a high lift system at the leading edge of the airfoil of an aircraft according to the preamble of claim 1.

Leading-edge flaps disposed on the airfoils of passenger and transport aircraft are used to increase the lift at high angles of attack such as are required for take-off and landing, by displacing a flow around the wing nose towards higher angles of attack. At the location of the greatest curvature, the flow around the wing nose causes very low pressures, so-called suction peaks which are followed by severe pressure rises in the subsequent profile. The strong pressure gradients associated therewith weaken the boundary layer and ultimately cause flow separation which limits the maximum possible lift of the wing. The fluid-mechanical effect of leading-edge flaps is primarily aimed at avoiding flow around the nose by moving the nose downwards "into the wind". In addition, in many leading-edge flap designs, the low-energy boundary layer on the upper side of the wing is supplied with an energetic flow from the underside of the wing via a gap formed between the rear side of the leading-edge flap and the front side or nose of the main wing. This secondary effect of the leading-edge flap increases the lift but also the drag of the entire airfoil. However, an increase in the drag is only desirable in the landing configuration, for the take-off configuration the drag should be as low as possible.

A large number of solutions for leading-edge flaps are known and have been implemented. A distinction is made between droop noses which can be folded downwards at a hinge line located on the front side of the main wing without opening an additional gap, curved noses, leading-edge flaps with fixed gaps, foldable leading-edge flaps—so-called Krüger flaps—in various designs, curvable Krüger flaps and finally so-called slats in which a gap is exposed between the rear edge of the leading-edge flap and the nose of the main wing during the retracting movement.

Slats such as are used, for example, on the A340 Airbus are displaced by means of circular-arc-segment-shaped curved rails mounted on rollers which are driven by means of gears or rotary actuators and to which the leading-edge flaps are firmly connected. It is less common but also known to provide this connection movably and via an additional coupling to control the gap width. Droop noses in which the leading-edge flap can be folded downwards with respect to the nose of the main wing on a hinge line in the manner already explained above are known from the Airbus A380. A high lift system on the airfoil of an aircraft is further known from U.S. Pat. No. 4,447,027 in which a wing trailing-edge flap is disposed on the main wing by means of a four-bar mechanism. This four-bar mechanism contains two levers which are mounted in an articulated manner on the one hand each having their lower end on the supporting structure of the wing and on the other hand at their upper end on a flap support of the trailing-edge flap. The two levers have approximately the same length and their base points at which they are connected to the supporting structure of the wing in an articulated manner are disposed very close to one another compared with the length of the levers so that the trailing-edge flap describes an almost circular path around the base points of the levers during its retracting movement.

Document U.S. Pat. No. 1,780,838 A discloses a main wing and a forwardly located auxiliary wing or a leading edge flap which is coupled to the main wing by a four-bar mechanism for being freely movable between a retracted position and an extended position from said main wing solely by the action of the air pressure on the surface of said auxiliary wing. The four-bar mechanism comprises two levers which are pivoted in a distance from each other to the main wing (H) in an articulated manner and the second lever and which are each pivoted at the respectively other end to the auxiliary wing.

The object of the invention is to provide a high lift system comprising a leading-edge flap disposed on the airfoil of an aircraft which makes it possible to position the leading-edge flap as optimally as possible for take-off and landing configurations.

The object is achieved by a high lift system having the features of claim 1. Advantageous embodiments and further developments of the high lift system according to the invention are characterised in the dependent claims.

An important advantage of the high lift system according to the invention is that in the take-off position, the leading-edge flap almost completely closes the gap and therefore does not allow resistance-increasing flow through the same. In the landing position, on the other hand, the opening gap permits a positive influencing of the boundary layer on the upper side of the main wing due to the incipient separation flow between the leading-edge flap and the main wing which is necessary for achieving maximum lift at low landing speeds. Further advantages of the high lift system according to the invention are that its kinematics require few moving parts, which can be implemented merely by means of levers interconnected by means of pivot joints and therefore it needs little maintenance and has little susceptibility to breakdown.

An exemplary embodiment of the high lift system according to the invention will be described in the following with reference to the drawings, whereby further features and advantages of the invention are obtained.

Figure 2:
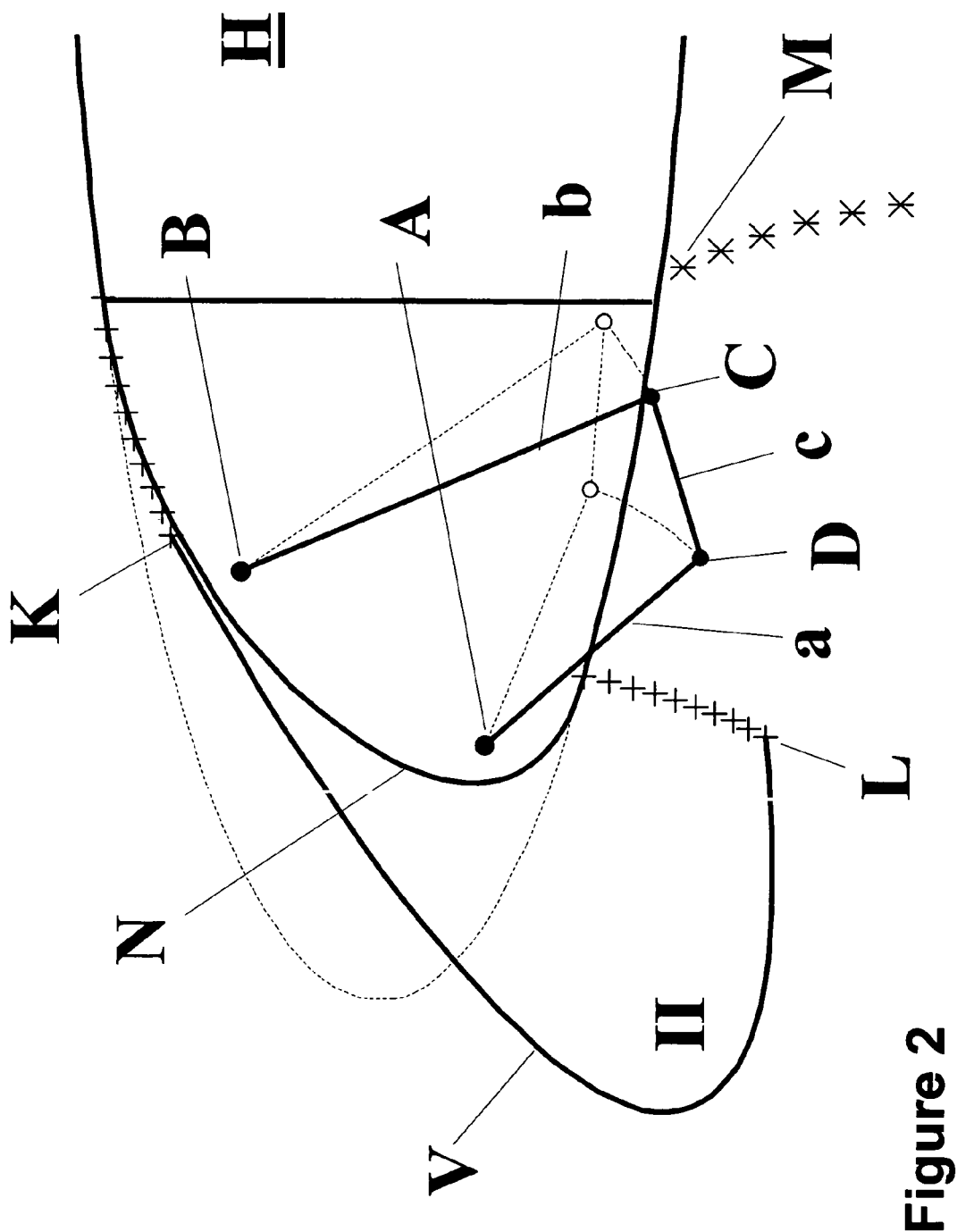
Figure 3:
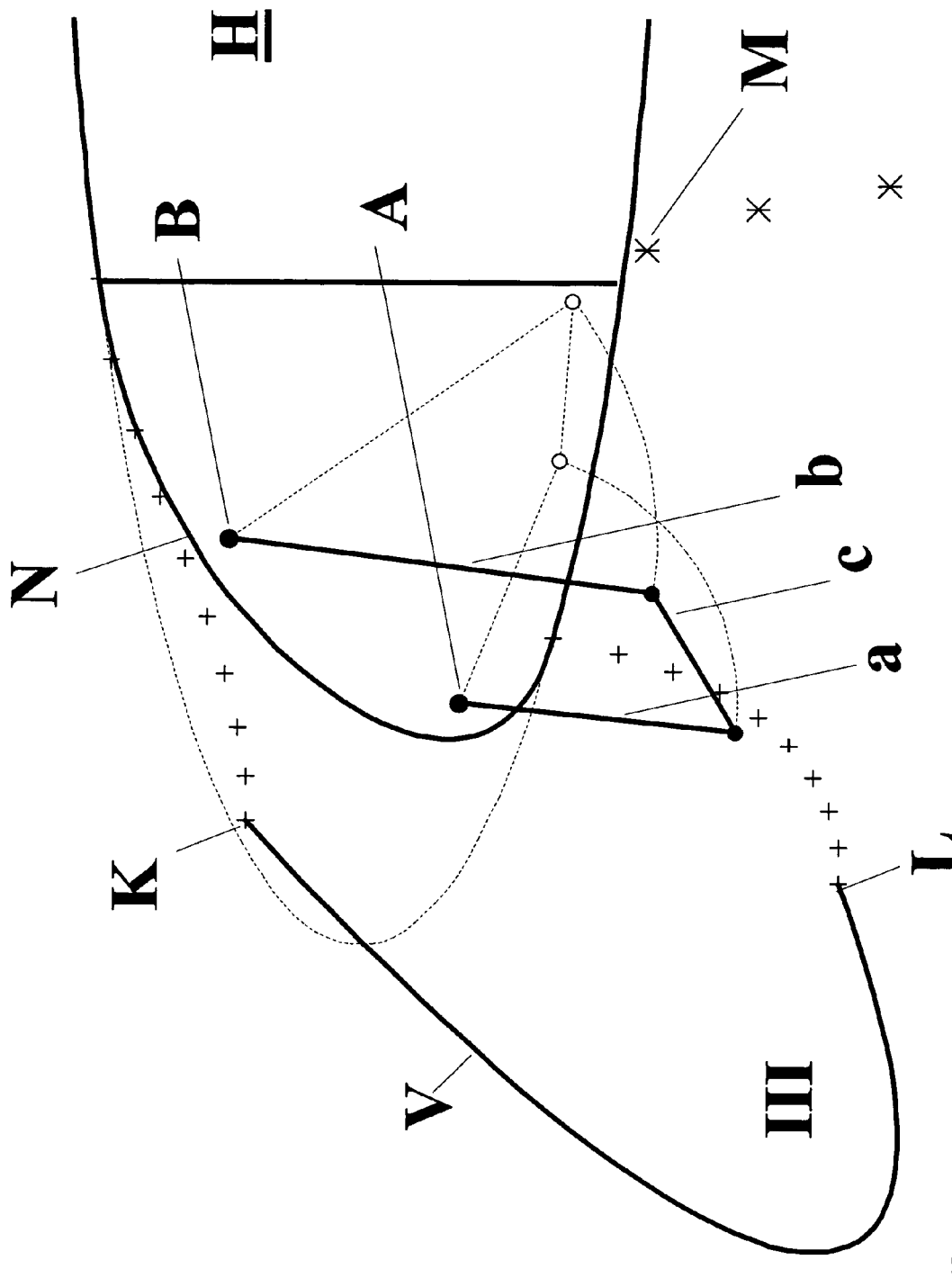
Figure 4:
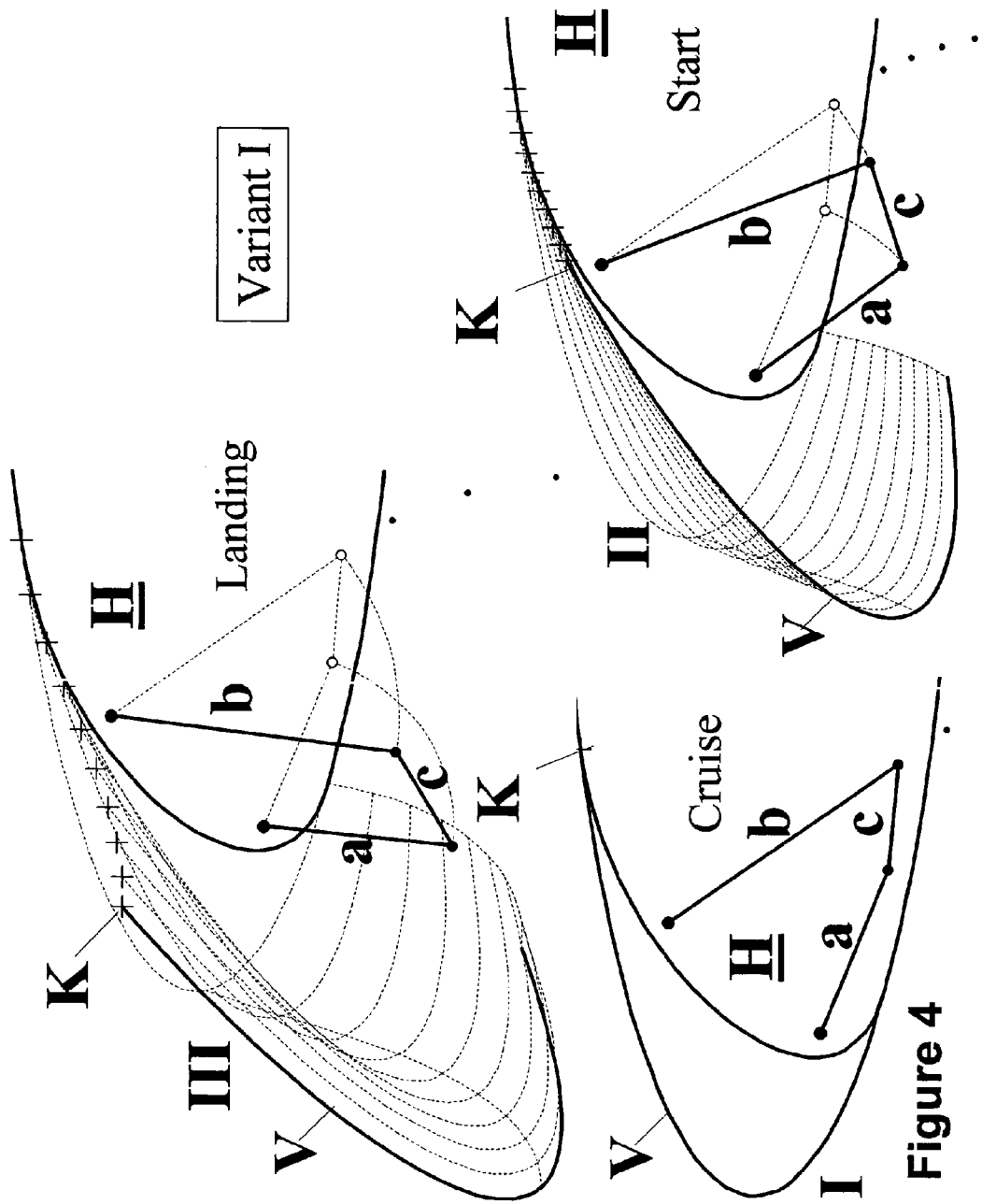
Figure 5:
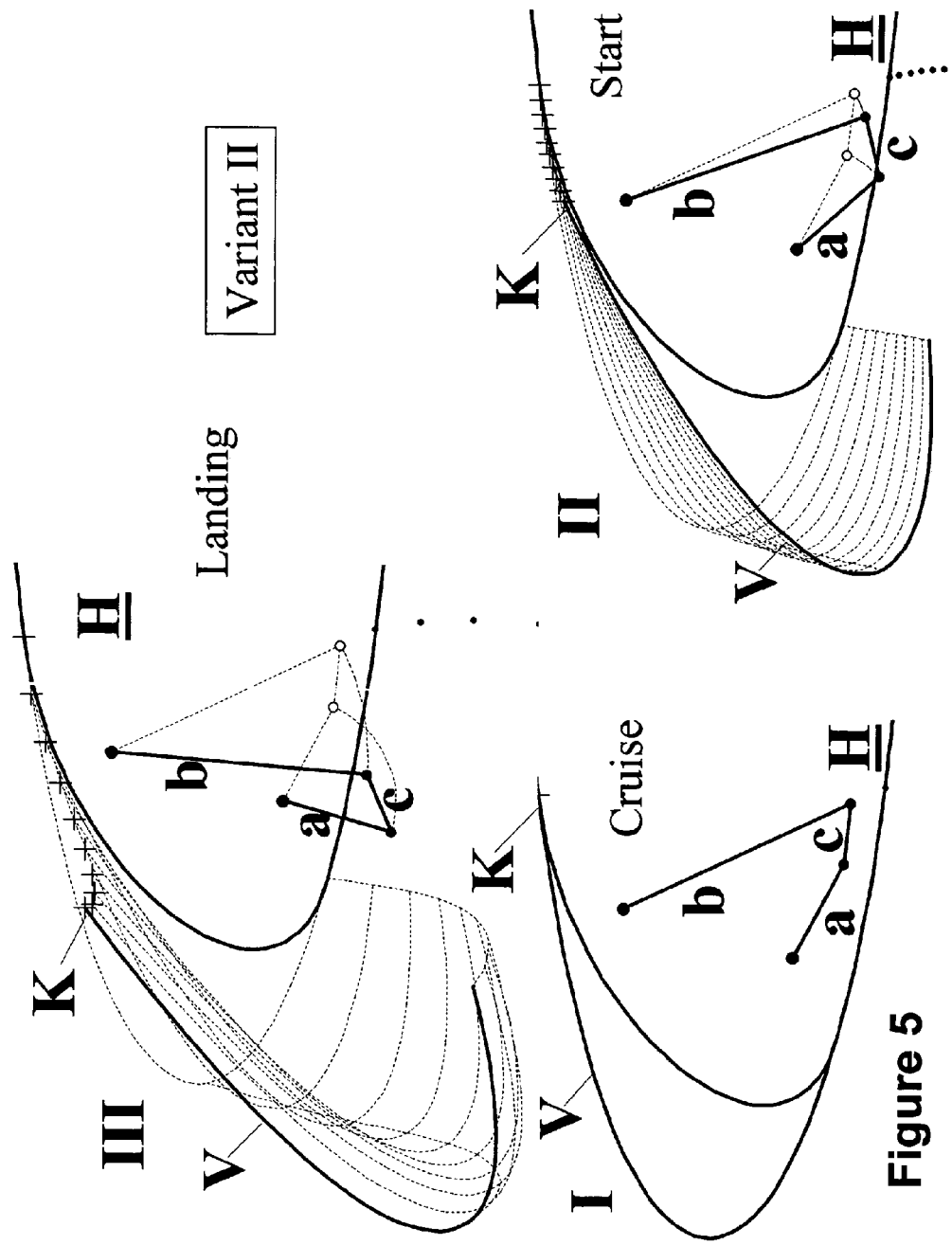
Figure 6:
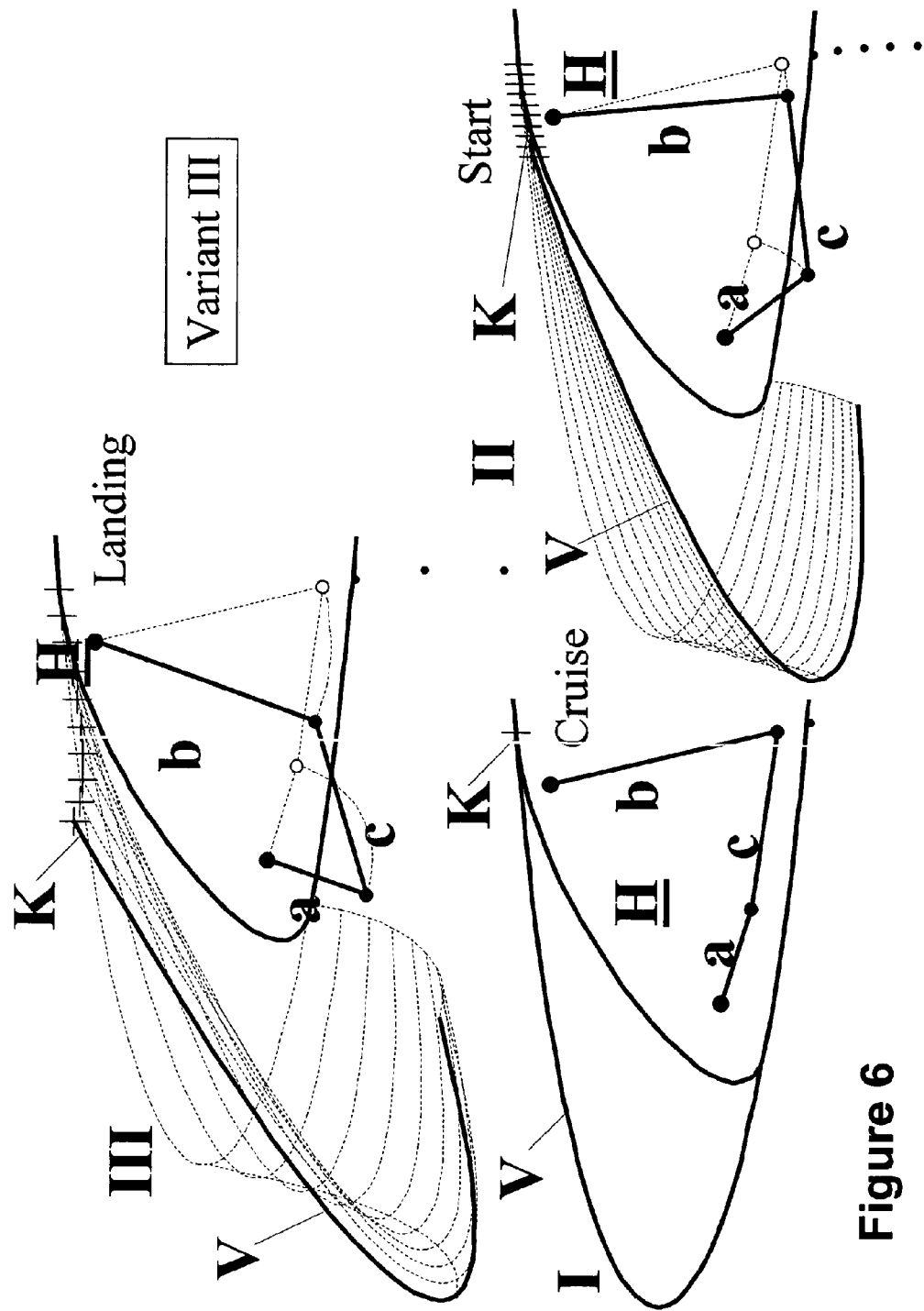
Figure 7:
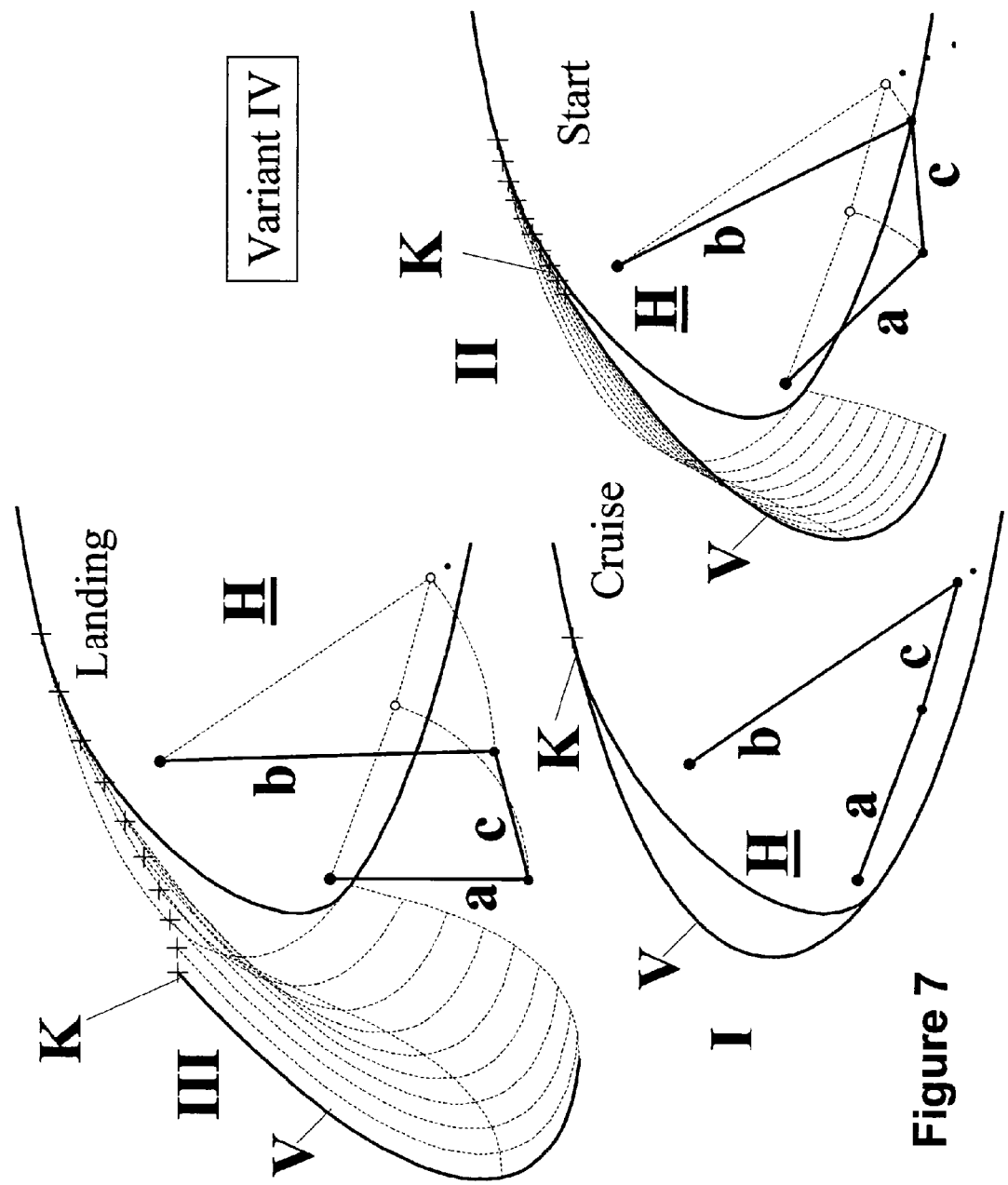

In the figures:

FIG. 1 shows a schematic cross-sectional view of a high-lift system on the airfoil of an aircraft according to an exemplary embodiment of the invention in the area of the leading-edge flap and the main wing nose, which shows the leading-edge flap of the high lift system and its actuating mechanisms in its retracted position I and for comparison, the leading-edge flap alone in a fully extended position III; and FIGS. 2 and 3 show schematic cross-sectional views of the exemplary embodiment from FIG. 1 which show the leading-edge flap of the high lift system and its actuating mechanism in two positions extended to different extents, i.e. in FIG. 2 in a partially extended take-off position with closed gap and in FIG. 3 in a fully extended landing position with opened gap; and FIGS. 4 to 7 show exemplary embodiments according to four different variants of a high lift system on the airfoil of an aircraft having different geometries, wherein the extending movement is shown in ten phases in each case.

FIG. 8 is a table of parameters for the respective exemplary embodiments I to IV shown in FIGS. 4-7.

FIGS. 1 to 3 show the front part of a high lift system on the airfoil of an aircraft, which comprises a main wing H and a leading-edge flap V disposed thereon. The main wing H has a nose N with a predefined curvature which is more or less covered or overlapped by the leading-edge flap V according to its position. FIG. 1 shows the leading-edge flap V once in a fully retracted position I and on the other hand in a fully extended position III. The overlap u between the trailing edge of the leading-edge flap V and the main wing nose N still provided in the fully extended position III is illustrated by two arrows. In the fully extended position III a gap g is exposed between the trailing edge K of the leading-edge flap V and the nose curvature V, through which energetic air can flow from the underside of the leading-edge flap V to the upper side of the main wing H, as is desirable for the landing configuration of the wing.

The leading-edge flap V can be extended by means of an arrangement comprising a total of three levers a, b, c, forming a four-bar mechanism, which forms its actuating mechanism, in such a manner that said leading-edge flap can be moved from the retracted position I whilst increasing the extension of the airfoil profile in the chord direction and increasing its curvature as far as the fully extended position III. In the course of this extending movement, the gap g which guides energetic air from the underside of the leading-edge flap V to the upper side of the main wing H is exposed.

The lever arrangement a, b, c configured in the form of said four-bar mechanism comprises a first lever a and a second lever b, of which the first lever a is connected at its upper end to a first point A on the main wing H and the second lever b is connected at its upper end to a second point B at a distance therefrom on the main wing H in an articulated manner. At their respective lower ends the two levers a, b are connected in an articulated manner to the ends of a third lever c which is part of the leading-edge flap V and thus defines its extending movement.

The kinematic system by which means the leading-edge flap V is suspended on the main wing H thus consists of a fixed base which is formed by the points A and B located on the main wing H. The leading-edge flap V is connected to this base by means of the three-member lever system a, b, c forming said four-bar mechanism. The first lever a adjoins the point A with its one end and the second leer b adjoins the point B with its one end. The respective free other ends of the two levers a and b which move in the reference system of the main wing H on respective orbits around the points A or B are coupled by means of the third lever c, i.e. by means of further joints D or C as shown in FIG. 2, whereby the four-bar mechanism is closed. In the exemplary embodiment described here, the third lever c which ultimately defines the movement of the leading-edge flap V is firmly connected to the leading-edge flap V or is a structural component of the same. The kinematic system formed by the main wing H and the leading-edge flap V is kinematically determined by the four-bar mechanism.

In the retracted state the hinge points and levers a, b, c are located within the contour of the wing H or the leading-edge flap V. In the extended state, penetration of the upper side of the fixed nose N should be avoided. In FIG. 1 the angle a between the first lever a and a parallel to the chord direction of the aircraft is specifically given, this forms a variable which is capable of describing the extending movement of the leading-edge flap V. The angle φ through which the leading-edge flap V is folded with respect to the chord direction of the airfoil is likewise shown in FIG. 1, i.e., for the case of the fully extended position III, said angle is a function of the previously specified angle α between the first lever a and the chord direction. A corresponding angle β between the second lever b and the parallel to the chord direction of the aircraft forms another variable which is capable of describing the extending movement of the leading-edge flap V. For better clarity this angle β is not specifically given in FIG. 1 but it should be seen as similar to the angle α.

In the exemplary embodiment shown, the length and mutual position of the levers a, b, c and the curvature of the main wing nose N are matched to one another in such a manner that during a first part of the extending movement from the retracted position I as far as an intermediate position II, which is shown in FIG. 2 and which corresponds to a take-off configuration of the airfoil, the trailing edge K of the leading-edge flap substantially blocks the gap g and during a further part of the extending movement following the intermediate position II, the trailing edge K of the leading-edge flap increasingly exposes the gap g, which corresponds to the landing configuration of the airfoil and is shown in FIG. 3 for the fully extended position III. FIGS. 2 and 3 show the paths of the (upper) trailing edge K of the leading-edge flap V and of its lower rearward edge L (so-called slat hook) during the extending movement by a sequence of small crosses and also the path of the instantaneous centre of rotation M of the movement of the leading-edge flap V. In the take-off configuration shown in FIG. 2, the angle φ between the leading-edge flap V and the chord is typically around 20°, i.e., 20°±5°, in the landing configuration shown in FIG. 3, this is typically around 30°, i.e., 30°±5°.

As a result of said suitable positioning and matching of the levers a, b, c, it is possible to move the leading-edge flap V in said first part of the extending movement along a convex path wherein the instantaneous centre of rotation M can lie outside and below the contour of the main wing nose N at the beginning of the movement, as can be seen from FIG. 2. The movement here is similar to the slat described initially which is extended by a circular-arc-segment-shaped rail. In this part of the movement, the leading-edge flap V is driven along the contour of the main wing nose N, i.e. the trailing edge K of the leading-edge flap follows this contour so that the gap g is closed or at least has only a minimal width, e.g. less than ¹⁄₁₀ of the travel of the trailing edge K at the respective point, i.e. there is virtually no through-flow, as is desirable for the take-off configuration of the airfoil.

In the further course of the movement, a translational component begins to dominate the extending movement as can be see from FIG. 3 whilst the rotational movement shown in FIG. 2 recedes into the background. At the same time, the instantaneous centre of rotation M of the movement changes to the other side, i.e. from below the main wing nose N to above as is illustrated by the path of the trailing edge K which can be seen in FIG. 3. As a result of the geometrical relationships, the entire leading-edge flap V therefore goes over into a movement which guides it forwards away from the main wing H. Associated with this in the example shown is a further increase in the leading-edge flap angle φ to about 30°, as already mentioned, as is typical for the landing configuration. At the same time, the gap g required for through-flow opens as can be seen from FIGS. 1 and 3.

The geometry of the kinematic system shown with reference to the exemplary embodiment described in FIGS. 1 to 3 is only exemplary and stands for a number of different possible combinations as to how the four-bar mechanism formed by the position of the points A and B as well as the lever lengths a, b, c can be designed and adapted to the geometry of the main wing nose N and the leading-edge flap V. These can be determined by systematic tests and calculations.

Characteristic for example, as in the exemplary embodiment shown in FIGS. 1 and 3, is a relatively short first lever a and an approximately twice as long second lever b, the third lever c is typically somewhat shorter than the first lever a. In the exemplary embodiment shown in FIGS. 1 to 3, the distance between the two points A and B at which the two levers a, b are connected to the main wing H in an articulated manner is taken together approximately corresponding to the length of the first lever a and the third lever c. In order that the desired characteristic movement of the leading-edge flap V during extension away from the fixed part of the main wing H is achieved, the form of the four-bar mechanism formed by the three levers a, b, c must be approximately that of an upwardly open U. As shown in FIGS. 1 to 3, at the beginning of the extending movement, i.e. in the retracted position I, the longer second lever b stands almost perpendicularly on the contour of the main wing nose N in the vicinity of the point B at which the second lever b is connected to the main wing H. The bearing point B at which the second lever b is hinged on the main wing H is the end of the second lever b closer to the contour of the main wing nose N. The first lever a is deflected by about 90° over the entire extending movement, as can be seen from FIG. 3.

The first lever a which is arranged in front of the second lever b in relation to the chord direction of the airfoil and is shorter than this, can, for example, have a length of between about 25 and 110% of the distance of the points A and B, in particular for example, between 90 and 100%. The lever b has a length of about 75 to 200% of the distance of points A and B, in particular for example between 140 and 160%. The length of the third lever c can be between about 25 and 75% of the distance AB, in particular for example between 50 and 65%. As already mentioned, the second lever b can be arranged in particular so that in the retracted position I of the leading-edge flap V, it stands substantially perpendicularly on the contour of the main wing nose N in the area of the point B at which the second lever b is connected to the main wing H in an articulated manner. The first lever a can be arranged in particular so that during the extending movement from the retracted position I to the fully extended position III, said lever is deflected by about 70° to 110°, typically about the aforesaid approximately 80°.

FIGS. 4 to 7 show four exemplary embodiments in the form of variants I to IV as to how the four-bar mechanism formed by the positions of the points A and B as well as the lever lengths a, b, c is designed and can be adapted to the geometry of the main wing nose N and the leading-edge flap V. For illustration purposes, in each case ten phases of the extending movement from the retracted configuration or cruise position I into the take-off configuration II or from the retracted configuration or cruise position I into the landing configuration III are shown. The table of FIG. 8 gives the most important parameters for these four variants. These are the respective lengths of the levers a, b, c in percent relative to the length of the distance AB of the points A and B from one another (100%) as well as the angles of rotation $\Delta\alpha$ and $\Delta\beta$ of the levers a and b for the landing configuration II and the take-off configuration III and also the landing flap angle $\phi$ for these two configurations of the high lift system.

As has already been explained with reference to FIGS. 1 to 3, in these exemplary embodiments at the beginning of the extending movement, i.e. in the retracted position I, the longer second lever b stands almost perpendicularly on the contour of the main wing nose N in the vicinity of the point B at which the second lever b is connected to the main wing H. The bearing point B at which the second lever b is hinged on the main wing H is the end of the second lever b nearer to the contour of the main wing nose N. Also at the beginning of the extending movement, i.e. in the retracted position I, the shorter first lever a stands almost perpendicularly on the contour of the main wing nose N in the vicinity of the point A at which the first lever a is connected to the main wing H. Also the bearing point A at which the first lever a is hinged on the main wing H is the end of the first lever a nearer to the contour of the main wing nose N. Over the full extending movement the first lever a is deflected by the angle of rotation $\Delta\alpha$ of the order of magnitude of 90°, i.e. between 70° (variant IV) and 94° (variant III), as can be seen from FIGS. 4 to 7. Over the full extending movement, the second lever b is deflected by the angle of rotation $\Delta\beta$ of the order of magnitude of 45°, i.e. between 32° (variant II) and 45° (variant I).

The arrangement of the four-bar mechanism formed by the levers a, b, c described allows the movement of the leading-edge flap V in the first part of the extending movement from position I to position II to follow a convex path, wherein at the beginning of the movement the instantaneous centre of rotation M can lie outside and below the contour of the main wing nose N. In this part of the movement the leading-edge flap V is driven along the contour of the main wing nose N, i.e. the trailing edge K of the leading-edge flap follows this contour so that the gap g is closed or at least has only a minimal width, i.e. virtually no flow takes place, as is desirable for the take-off configuration of the airfoil. In the further course of the movement a translational component begins to dominate the extending movement whilst the rotational movement recedes into the background. At the same time, the instantaneous centre of rotation M of the movement changes to the other side, i.e. below the main wing nose N to above, as is illustrated by the path of the trailing edge K of the leading-edge flap V which can be seen in FIGS. 4 to 7. As a result of the geometrical relationships, the entire leading-edge flap V therefore goes over into a movement which guides it forwards away from the main wing H. Associated with this in the example shown is a further increase in the leading-edge flap angle $\phi$ to about 30°, as already mentioned, as is typical for the landing configuration. The gap g required for the through-flow opens in this case, as can be seen from FIGS. 4 to 7, configuration III.

The kinematics of the high lift system described permits a very low-lying connection between leading-edge flap V and main wing H so that the forming flow through the gap g is barely perturbed, especially at the end of its running length. The high lift system can be designed so that no components of the kinematics penetrate the front spar of the main wing H and as a result, the complexity and weight of the structure are low and in addition, the tank volume in the main wing H is not restricted. Despite the travel paths of the levers a, b determining the kinematics, sufficient space is available for integrating systems extending over the span. The system-side connection via shafts and actuators for actuating the high lift system can be taken without changing the topology or can be at least similar to that in conventional tried and tested systems.

REFERENCE LIST

H Main wing
V Leading-edge flap
A Fixed point
B Fixed point
a First lever
b Second lever
c Third lever
α Angle
β Angle
u Overlap
g Gap
φ Angle
N Main wing nose
K Trailing edge of leading-edge flap
L Slat hook
M Instantaneous centre of rotation of the leading-edge flap movement

The invention claimed is:

1. A high-lift system on a lifting surface of an aircraft, comprising a main wing which has a curved main wing nose and comprising a leading-edge flap which is disposed retractably on the main wing by means of an arrangement of several levers so that said leading-edge flap can be moved from a retracted position to a fully extended position which expands a profile of the lifting surface in the chord direction, increases the curvature of the lifting surface and creates a gap which guides energetic air from an underside of the leading-edge flap to an upper side of the main wing, wherein the lever arrangement is configured in the form of a four-bar linkage and comprises a first lever and a second lever, of which the first lever is connected at one end to a first point on the main wing in an articulated manner and the second lever is connected at one end to a second point on the main wing in an articulated manner at a distance from the first point, and the first and second levers are each connected at a respectively other end in an articulated manner to ends of a third lever which is part of and defines extending movements of the leading-edge flap, characterised in that the length and the mutual position of the levers and the curvature of the main wing nose are matched to one another such that during a first part of the extending movement from the retracted position to an intermediate position sufficient to substantially increase lift for take-off the trailing edge of the leading-edge flap substantially blocks the gap between the leading-edge flap and the main wing and that during a further part of the extension movement following the intermediate position, the trailing edge of the leading-edge flap increasingly exposes the gap.

2. The high lift system according to claim 1, characterised in that the first lever is connected in an articulated manner at its upper end to the first point on the main wing and the second lever is connected in an articulated manner at its upper end to a second point at a distance from the first point on the main wing.

3. The high lift system according to claim 1, characterised in that the first lever is disposed in front of the second lever in relation to the chord direction of the lifting surface and is shorter than said second lever.

4. The high lift system according to claim 3, characterised in that the length of the first lever is between about 25 and 110% of a length defined by the distance between the first point and the second point.

5. The high lift system according to claim 4, characterised in that the length of the first lever is between about 90 and 100% of said length.

6. The high lift system according to claim 3, characterised in that the length of the second lever is between about 75 and 200% of a length defined by the distance between the first point and the second point.

7. The high lift system according to claim 6, characterised in that the length of the second lever is between about 140 and 160% of said length.

8. The high lift system according to claim 3, characterised in that the length of the third lever is between about 25 and 75% of a length defined by the distance between the first point and the second point.

9. The high lift system according to claim 8, characterised in that the length of the third lever is between about 50 and 65% of said length.

10. The high lift system according to claim 1, characterised in that the second lever is disposed in such a manner that in the retracted position of the leading-edge flap, said second lever stands substantially perpendicularly on the contour of the main wing nose.

11. The high lift system according to claim 1, characterised in that the first lever is disposed in such a manner that in the retracted position of the leading-edge flap, said first lever stands substantially perpendicularly on the contour of the main wing nose.

12. The high lift system according to claim 1, characterised in that the first lever is disposed in such a manner that during the extending movement from the retracted position to the fully extended position said lever is deflected by about 65 degrees to 110 degrees.

13. The high lift system according to claim 1, characterised in that the second lever is disposed in such a manner that during the extending movement from the retracted position to the fully extended position said lever is deflected by about 30 degrees to 50 degrees.

14. The high lift system according to claim 1, characterised in that said second point at which the second lever is hinged on the main wing is the end of the second lever closer to the contour of the main wing nose, at least in the retracted position of the leading-edge flap.

15. The high lift system according to claim 1, characterised in that said first point at which the first lever is hinged on the main wing is the end of the first lever closer to the contour of the main wing nose, at least in the retracted position of the leading-edge flap.

* * * * *